United States Patent
Akachi et al.

(10) Patent No.: US 11,180,082 B2
(45) Date of Patent: Nov. 23, 2021

(54) WARNING OUTPUT DEVICE, WARNING OUTPUT METHOD, AND WARNING OUTPUT SYSTEM

(71) Applicant: CLARION CO., LTD., Saitama (JP)

(72) Inventors: Masashi Akachi, Ageo (JP); Masashi Koga, Hachioji (JP); Hiroshige Furugori, Tokyo (JP); Hiroki Abe, Ichikawa (JP); Hiroshi Sugihara, Utsunomiya (JP); Makoto Sugiyama, Shiraoka (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/630,755

(22) PCT Filed: Jan. 25, 2018

(86) PCT No.: PCT/JP2018/002259
§ 371 (c)(1),
(2) Date: Jan. 13, 2020

(87) PCT Pub. No.: WO2019/012720
PCT Pub. Date: Jan. 17, 2019

(65) Prior Publication Data
US 2020/0164797 A1 May 28, 2020

(30) Foreign Application Priority Data
Jul. 13, 2017 (JP) .............................. JP2017-137028

(51) Int. Cl.
*B60Q 9/00* (2006.01)
*B60N 2/90* (2018.01)
(Continued)

(52) U.S. Cl.
CPC ............... *B60Q 9/008* (2013.01); *B60N 2/90* (2018.02); *G08G 1/16* (2013.01); *B60K 35/00* (2013.01);
(Continued)

(58) Field of Classification Search
CPC ........ B60K 2370/167; B60K 2370/178; B60K 35/00; B60N 2002/981; B60N 2/90; B60Q 9/008; G08G 1/16
See application file for complete search history.

(56) References Cited

U.S. PATENT DOCUMENTS 10,163,350 B1 * 12/2018 Fields .................... G08G 1/166
2011/0284304 A1 * 11/2011 Van Schoiack ........ B62D 1/046
180/272
(Continued)

FOREIGN PATENT DOCUMENTS

DE 10-2015-20/1/4 A1 11/2016
EP 1585083 A2 10/2005
(Continued)

OTHER PUBLICATIONS

International Search Report for PCT/JP2018/002259, dated Feb. 20, 2018.
(Continued)

Primary Examiner — Thomas S McCormack
(74) Attorney, Agent, or Firm — Volpe Koenig

(57) ABSTRACT

An object is to provide a warning output device, a warning output method, and a warning output system that make it possible to appropriately output warning. A warning output device includes: a driver's state acquisition unit configured to acquire inattentive driving information indicating that a driver performs inattentive driving; a vehicle state acquisition unit configured to acquire a vehicle state; a vehicle warning reception unit configured to receive vehicle warn-
(Continued)

ing, which is warning corresponding to the vehicle state; an adaptive rule acquisition unit configured to acquire adaptive rule information generated when the driver performs inattentive driving and the warning is received; and an output unit configured to output inattentive driving warning, which is warning related to inattentive driving when the driver's state acquisition unit acquires the inattentive driving information and the vehicle state satisfies a predetermined condition specified in the adaptive rule information.

8 Claims, 15 Drawing Sheets

(51) Int. Cl.
  *G08G 1/16* (2006.01)
  *B60K 35/00* (2006.01)
(52) U.S. Cl.
  CPC .. *B60K 2370/167* (2019.05); *B60K 2370/178* (2019.05); *B60N 2002/981* (2018.02)

(56) References Cited

U.S. PATENT DOCUMENTS

2014/0125474 A1* 5/2014 Gunaratne ............. G08G 1/163
  340/439
2016/0267335 A1* 9/2016 Hampiholi ........... B60K 28/066

FOREIGN PATENT DOCUMENTS

| EP | 2143585 A1 | 1/2010 |
| EP | 3070700 A1 | 9/2016 |
| JP | 2010-217956 A | 9/2010 |
| JP | 2012-111274 A | 6/2012 |
| JP | 2014-95987 A | 5/2014 |
| JP | 2017-33126 A | 2/2017 |

OTHER PUBLICATIONS

Extended European Search Report dated Mar. 5, 2021 for European Patent Application No. 18831652.5.

* cited by examiner

OUTPUT SPECIFICATION INFORMATION 123

FIG. 4

VEHICLE WARNING DETECTION INFORMATION 321

- 321a
- 321b
- 321c
- 321d

| DRIVER IDENTIFICATION INFORMATION | DETECTION IDENTIFICATION INFORMATION | VEHICLE WARNING ||||||| SURROUNDING STATE AT OCCURRENCE OF VEHICLE WARNING |||||
|---|---|---|---|---|---|---|---|---|---|---|---|---|
| | | WARNING TYPE ||||||  ROAD TYPE || POSITION OF OWN VEHICLE |||
| | | FRONT COLLISION | REAR COLLISION | PEDESTRIAN | BICYCLE | DRIFTING | LANE DEPARTURE | ORDINARY ROAD | EXPRESSWAY | LEFT | CENTER | RIGHT |
| ***** | 01 | 1 | | | | | | 1 | | 1 | | |
| | 02 | 1 | | | | | | 1 | | 1 | | |
| | 03 | | 1 | | | | | 1 | | | 1 | |
| | 04 | | 1 | | | | | 1 | | | 1 | |
| | 05 | | | 1 | | | | 1 | | 1 | | |
| | 06 | | | | 1 | | | 1 | | 1 | | |
| | 07 | | | | | 1 | | 1 | | | 1 | |
| | 08 | | | | | | 1 | | 1 | | | 1 |
| | ⋮ | ⋮ | ⋮ | ⋮ | ⋮ | ⋮ | ⋮ | ⋮ | ⋮ | ⋮ | ⋮ | ⋮ |

FIG. 5

VEHICLE WARNING DETECTION INFORMATION 321

| DRIVER IDENTIFICATION INFORMATION (321a) | DETECTION IDENTIFICATION INFORMATION (321b) | SURROUNDING STATE AT OCCURRENCE OF VEHICLE WARNING | | | | | | | | STATE OF OWN VEHICLE (321d) | | DRIVER'S STATE (321e) | | | |
|---|---|---|---|---|---|---|---|---|---|---|---|---|---|---|---|
| | | STATE OF SURROUNDING VEHICLES | | | | | | PEDESTRIAN | BICYCLE | VEHICLE SPEED AT WARNING | BRAKING | INTERIOR-IMAGING CAMERA (3211) | | BIOLOGICAL INFORMATION (3212) | |
| | | LEFT FRONT | CENTER FRONT | RIGHT FRONT | LEFT REAR | CENTER REAR | RIGHT REAR | | | | | INATTENTIVE DRIVING DETECTION | POSTURE DETECTION | PULSE RATE | BREATHING RATE |
| | 01 | 1 | | | | | | | | 45km/h | | | | | |
| | 02 | 1 | | | | | | | | 30km/h | | | | | |
| | 03 | | | | 1 | 1 | | | | 20km/h | | 1 | | | |
| ***** | 04 | | | | 1 | 1 | | | | 20km/h | | 1 | | | |
| | 05 | | | | | 1 | | 1 | | 40km/h | | 1 | | | |
| | 06 | | | | 1 | | | | 1 | 40km/h | | 1 | | | |
| | 07 | 1 | | | | | | | | 50km/h | | 1 | | | |
| | 08 | | | 1 | | | | | | 70km/h | | | | | |
| | ... | ... | ... | ... | ... | ... | ... | ... | ... | ... | ... | ... | ... | ... | ... |

FIG. 6

INDIVIDUAL ADAPTIVE RULE INFORMATION 322

| 322a | 322b | 322c | 322d | 322e | 322f | 322g | |
|---|---|---|---|---|---|---|---|
| DRIVER IDENTIFICATION INFORMATION | VEHICLE WARNING TYPE | RULE IDENTIFICATION INFORMATION | DRIVER FACTOR | DETECTION IDENTIFICATION INFORMATION | OUTPUT IDENTIFICATION INFORMATION | THRESHOLD INFORMATION | ... |
| * * * | FRONT COLLISION DETECTION | * * * | INATTENTIVE DRIVING | * * * | * * * | * * * | ... |
|  |  | * * * | POSTURE | * * * | * * * | * * * | ... |
|  | REAR COLLISION DETECTION | * * * | BREATHING | * * * | * * * | * * * | ... |
|  |  | * * * | INATTENTIVE DRIVING | * * * | * * * | * * * | ... |
|  | PEDESTRIAN DETECTION | * * * | INATTENTIVE DRIVING | * * * | * * * | * * * | ... |
|  |  | * * * | BREATHING | * * * | * * * | * * * | ... |
|  | BICYCLE DETECTION | * * * | INATTENTIVE DRIVING | * * * | * * * | * * * | ... |
|  |  | * * * | POSTURE | * * * | * * * | * * * | ... |
|  | DRIFTING DETECTION | * * * | POSTURE | * * * | * * * | * * * | ... |
|  |  | * * * | INATTENTIVE DRIVING | * * * | * * * | * * * | ... |
|  | DETECTION OF LANE DEPARTURE | * * * | POSTURE | * * * | * * * | * * * | ... |
|  |  | * * * | INATTENTIVE DRIVING | * * * | * * * | * * * | ... |
| ⋮ | ⋮ | ⋮ | ⋮ | ⋮ | ⋮ | ⋮ | ⋮ |

FIG. 12
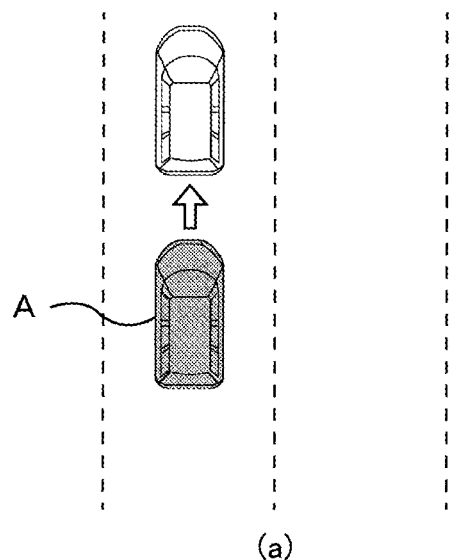
(a)
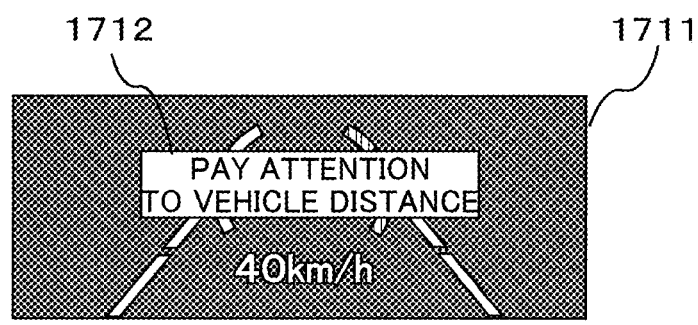
(b)
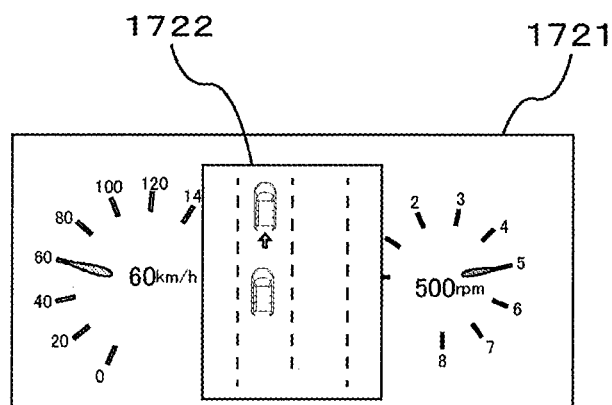
(c)

FIG. 13
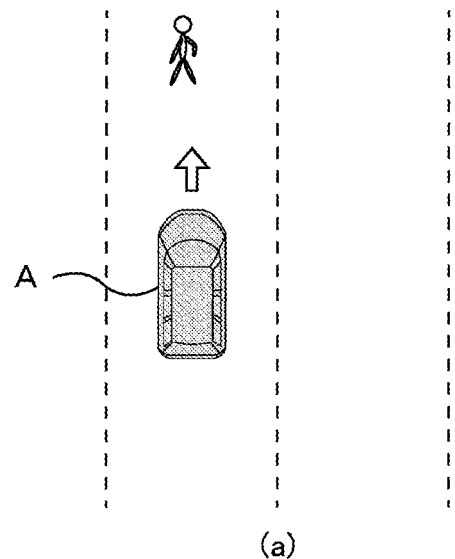
(a)
(b)
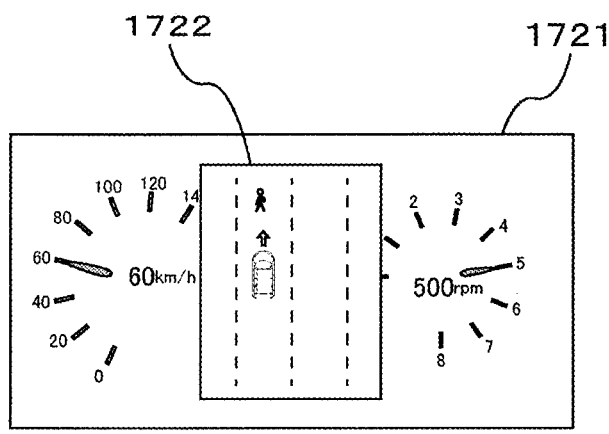
(c)

FIG. 14
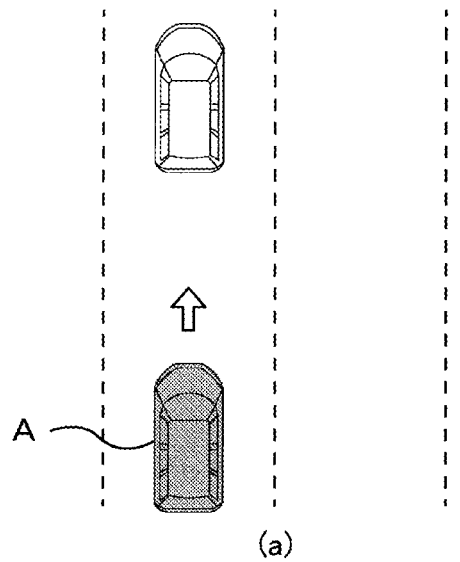
(a)
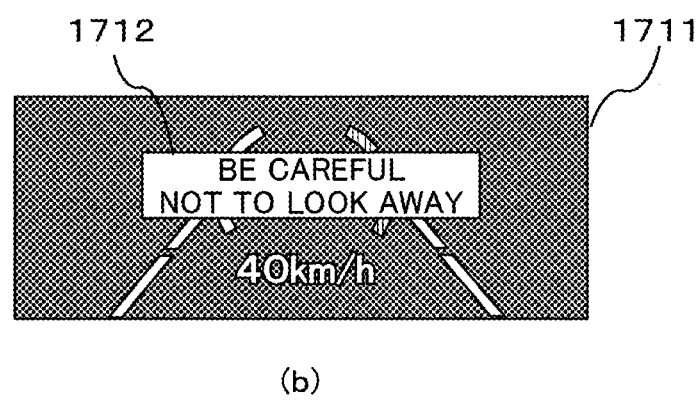
(b)
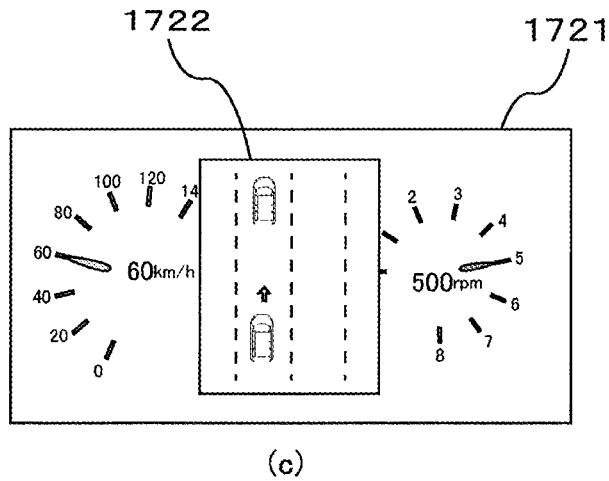
(c)

FIG. 15
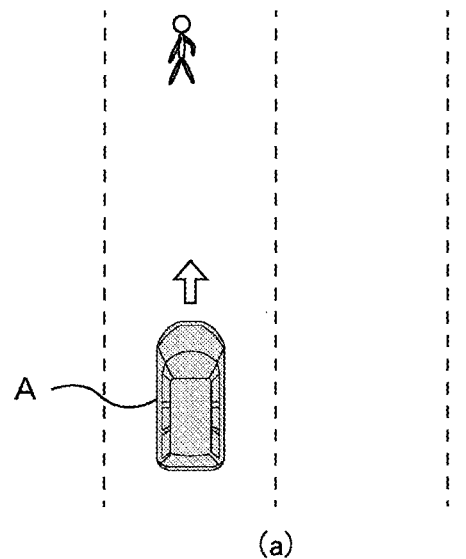
(a)
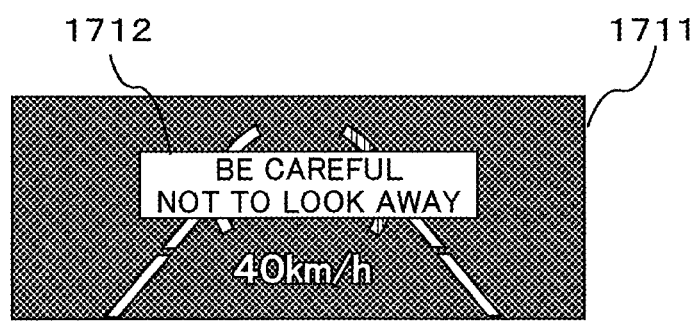
(b)
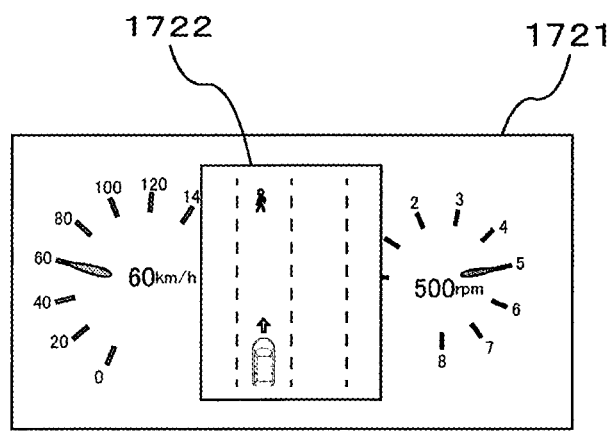
(c)

WARNING OUTPUT DEVICE, WARNING OUTPUT METHOD, AND WARNING OUTPUT SYSTEM

TECHNICAL FIELD

The present invention relates to a warning output device, a warning output method, and a warning output system. The present invention claims priority of JP 2017-137028 filed on Jul. 13, 2017, and the contents described in the application are incorporated herein by reference for the designated countries that approve incorporation by reference of literature.

BACKGROUND ART

PTL 1 discloses a technique related to a drive assist device. In PTL 1, paragraph [0035] includes a description of "the emergency drive detection unit 31 detects a danger avoidance action (emergency drive) of the vehicle driver", and paragraph [0040] includes a description of "the danger history creation unit 34 creates, every time the emergency drive detection unit 31 detects a danger avoidance action, danger record information including at least the location of the own vehicle at the time when the danger avoidance action is detected, and stores the danger record information in the storage unit 14". In addition, paragraph [0020] includes a description of "the speaker 15 is controlled by the control unit 16 and outputs, when the own vehicle is heading toward the location included in the danger record information, voice, beep sound, or the like corresponding to a suitable one of various kinds of information such as warning information encouraging safe driving".

CITATION LIST

Patent Literature

PTL 1: JP 2015-219736A

SUMMARY OF INVENTION

Technical Problem

There is a technique for outputting warning when a driver looks away while driving. In this technique, however, warning is also output in response to movement of a line of sight necessary for drive operations, such as a change of direction including turning right or turning left and a lane change, in some cases, and this is burdensome. In addition, as described in PTL 1, in the technique for storing history of vehicle state such as danger avoidance actions and calling driver's attention when the vehicle reaches the same location, warning is output based only on location information, and hence the warning output may not correspond to need for the driver really to pay attention.

The present invention has been made in view of the above respects, and an object of the present invention is to provide a warning output device, a warning output method, and a warning output system that make it possible to appropriately output warning.

Solution to Problem

The present application includes a plurality of solutions to the above-mentioned problem. One example of the solutions is as follows.

To solve the above-described problem, a warning output device of the present invention includes: a driver's state acquisition unit configured to acquire inattentive driving information indicating that a driver performs inattentive driving; a vehicle state acquisition unit configured to acquire a vehicle state; a vehicle warning reception unit configured to receive vehicle warning, which is warning corresponding to the vehicle state; an adaptive rule acquisition unit configured to acquire adaptive rule information generated when the driver performs inattentive driving and the warning is received; and an output unit configured to output inattentive driving warning, which is warning related to inattentive driving when the driver's state acquisition unit acquires the inattentive driving information and the vehicle state satisfies a predetermined condition specified in the adaptive rule information.

Advantageous Effects of Invention

According to the present invention, it is possible to provide a warning output device, a warning output method, and a warning output system that make it possible to appropriately output warning.

A problem, configuration, and effect other than those described in the above will be apparent from the description of embodiments given below.

BRIEF DESCRIPTION OF DRAWINGS

FIG. 4 is a diagram (part 1) illustrating an example of a data structure of vehicle warning detection information.

FIG. 5 is a diagram (part 2) illustrating an example of the data structure of the vehicle warning detection information.

FIG. 6 is a diagram illustrating an example of a data structure of individual adaptive rule information.

FIG. 12 is a diagram (part 1) illustrating an example of output information.

FIG. 13 is a diagram (part 2) illustrating an example of the output information.

FIG. 14 is a diagram (part 3) illustrating an example of the output information.

FIG. 15 is a diagram (part 4) illustrating an example of the output information.

DESCRIPTION OF EMBODIMENTS

Figure 1:
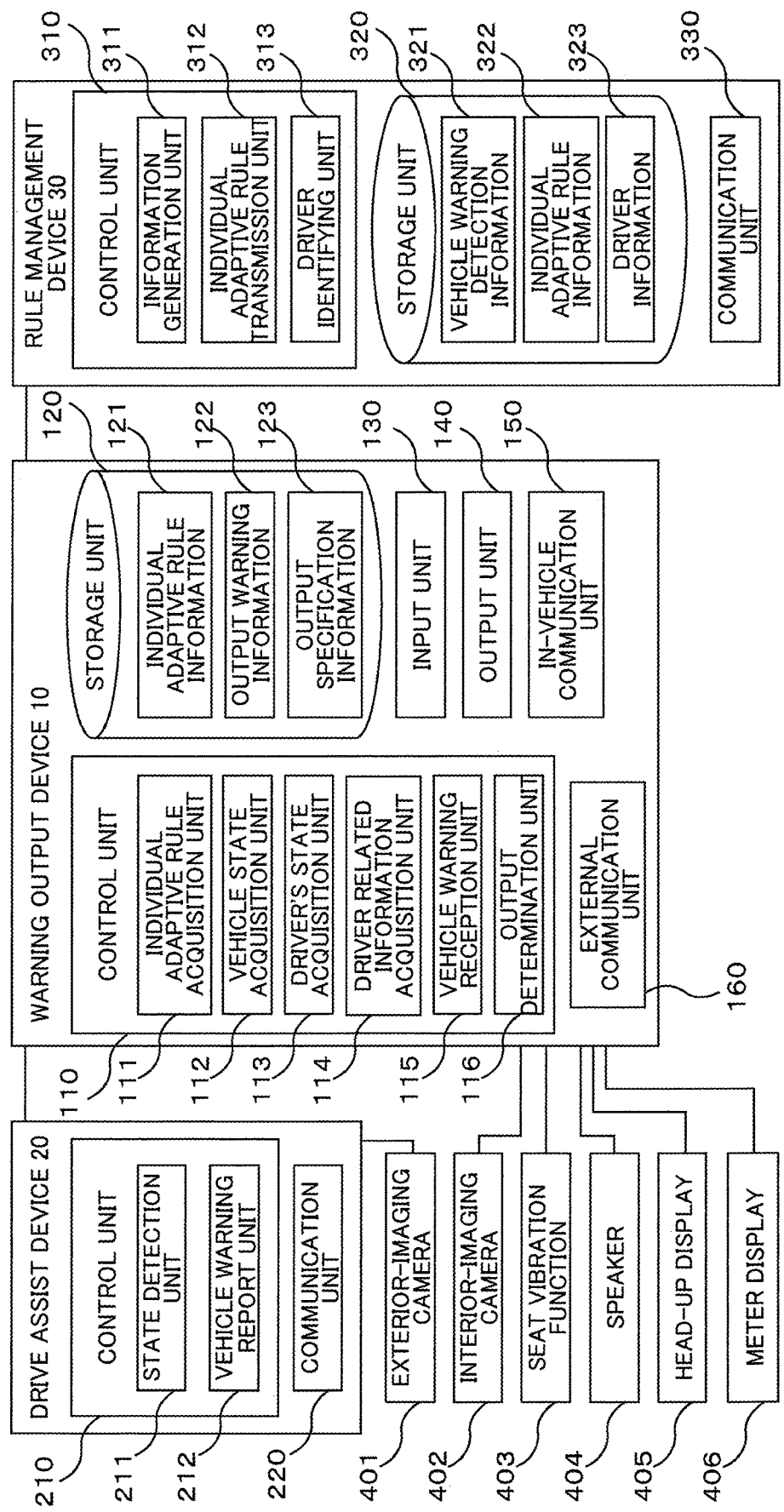
FIG. 1 is a diagram illustrating an example of a functional block of a warning output system.

Examples of embodiments of the present invention will be described below with reference to the drawings. FIG. 1 is a diagram illustrating an example of a functional block of a warning output system 1. The warning output system 1 in the present embodiment includes a warning output device(s) 10 and a drive assist device 20 that are installed in a vehicle (referred to as a "vehicle A" below), and a rule management device 30.

The warning output device 10 is an on-board device that outputs information to a user. The warning output device 10 is an information processing device such as a navigation device, an electronic control unit (ECU), a personal computer (PC), or a smartphone, for example.

The drive assist device 20 is an on-board device that has a function of an advanced driving assistant system (ADAS) and a function of an automatic-drive control system, for example. The drive assist device 20 may be an information processing device such as an ECU. The drive assist device 20 measures a traveling state and surroundings of the vehicle A by using a sensor such as a camera or infrared rays and also detects objects located outside the vehicle A such as vehicles traveling in front of and around the vehicle A and pedestrians. Note that the warning output device 10 and the drive assist device 20 simply need to be communicably connected, and a communication method is not limited to any.

The rule management device 30 is an information processing device such as a server device or a PC, for example. The rule management device 30 is a device belonging to a provider that provides a service of outputting warning to a plurality of vehicles, for example. The rule management device 30 is a device that generates individual adaptive rule information for managing, for each driver, information related to a condition for outputting warning and is communicably connected to one or a plurality of warning output devices 10.

The drive assist device 20 is communicably connected to an exterior-imaging camera 401. The warning output device 10 is also communicably connected to an interior-imaging camera 402, a seat vibration function 403, a speaker 404, a head-up display 405, and a meter display 406. The exterior-imaging camera 401 and the interior-imaging camera 402 are each an image pickup device using an image sensor such as a charge coupled device (CCD) and capture still images or moving images. The exterior-imaging camera 401 captures images of a state outside the vehicle, while the interior-imaging camera 402 captures images of a state inside the vehicle.

Note that the drive assist device 20 is capable of acquiring a vehicle state including an external state of the vehicle A, such as positional relationships between the vehicle A and vehicles other than the vehicle A and obstacles, and a traveling state of the vehicle A, such as vehicle speed and whether or not a breaking operation is performed. To obtain a vehicle state, the drive assist device 20 may be connected to a sensor, a radar, or a light detection and ranging (LIDER) that can specify a distance from an object outside the vehicle, instead of the exterior-imaging camera 401 or in addition to the exterior-imaging camera 401.

The drive assist device 20 may obtain vehicle states from another device, such as a vehicle speed sensor, a positioning signal receiver, a gyro sensor, a magnetic field sensor, an inclination sensor, a temperature sensor, and/or a motion detector, connected to the drive assist device 20 through a controller area network (CAN). Note that the exterior-imaging camera 401 may also be communicably connected to the warning output device 10.

The seat vibration function 403 is installed in a driver's seat and causes the driver's seat to vibrate by using vibrators, for example. The seat vibration function 403 includes a plurality of vibrators provided at different positions of the driver's seat, for example. Each of the vibrators can be controlled independent of each other. The seat vibration function 403 can cause each of the vibrators to vibrate in a predetermined pattern corresponding to information to be reported to the driver.

The speaker 404 is a device that outputs voice and sounds. The head-up display 405 is a display provided in an upper portion of an instrument panel located below the windshield inside the vehicle. The head-up display 405 may be a display that exerts a function by projecting an image onto a combiner provided on an inner side of the windshield, for example, or may be a display that exerts a function by projecting an image directly onto the windshield.

The meter display 406 is a display, such as a liquid crystal display (LCD) provided to the instrument panel.

The warning output device 10 includes a control unit 110, a storage unit 120, an input unit 130, an output unit 140, an in-vehicle communication unit 150, and an external communication unit 160. The control unit 110 performs centralized control of the entire warning output device 10. The storage unit 120 stores information necessary for processing performed by the control unit 110. The input unit 130 acquires information input via an input device, such as a touch panel. The output unit 140 outputs information to an output device such as the seat vibration function 403, the speaker 404, the head-up display 405, or the meter display 406. The in-vehicle communication unit 150 relays transmission and reception of information to and from the drive assist device 20. The external communication unit 160 relays transmission and reception of information to and from the rule management device 30 through a network (not illustrated), for example.

The control unit 110 includes an individual adaptive rule acquisition unit 111, a vehicle state acquisition unit 112, a driver's state acquisition unit 113, a driver related information acquisition unit 114, a vehicle warning reception unit 115, and an output determination unit 116. The individual adaptive rule acquisition unit 111 acquires, from the rule management device 30, individual adaptive rule information generated for the driver of the vehicle A.

Note that, when individual adaptive rule information has not been generated for the driver, the rule management device 30 does not transmit any individual adaptive rule information, and hence the individual adaptive rule acquisition unit 111 does not acquire any individual adaptive rule information.

The vehicle state acquisition unit 112 acquires a vehicle state related to a state of the vehicle A. The vehicle state acquisition unit 112 periodically acquires a vehicle state acquired by the drive assist device 20 by using the exterior-imaging camera 401, for example. As described previously, the vehicle state is an external state of the vehicle A, and a traveling state of the vehicle A and includes, for example, the relative position of another vehicle with respect to the vehicle A, the distance of the other vehicle to the vehicle A, the position of an object near the vehicle A, including a pedestrian or a bicycle, and the distance of the object to the vehicle A, the speed of the vehicle A, whether or not a breaking operation is performed, and the like.

The driver's state acquisition unit 113 acquires a driver's state indicating a state of the driver. More specifically, the driver's state acquisition unit 113 acquires inattentive driving information indicating that the driver performs inattentive driving.

Assume that the direction extending forward of the vehicle A from a driver's viewpoint is a normal line-of-sight direction and that the range within a predetermined angle (for example, 20 degrees) from the normal line-of-sight direction toward up, down, left, and right is a normal field of view. Inattentive driving refers to a state where a driver's line of sight is out of the normal field of view. The driver's state acquisition unit 113 acquires a driver's viewpoint and line-of-sight direction by using the interior-imaging camera 402 and determines whether the line-of-sight direction is out of the normal field of view to thereby detect inattentive driving. When the driver's state acquisition unit 113 detects inattentive driving, it is considered to have acquired inattentive driving information.

Note that a known technique can be used as a technique for acquiring a driver's line-of-sight direction from image data.

The driver's state acquisition unit 113 may acquire, as a driver's state, information related to the driver other than a state related to a driver's line of sight. For example, the driver's state acquisition unit 113 may acquire, as a driver's state, biological information such as a driver's pulse rate, heart rate, and breathing rate, detected by a biological sensor (not illustrated). In the following, a description will be given regarding, as a driver factor, a driver's state determined in advance as a state to be warned such as inattentive driving and inappropriate posture.

The driver related information acquisition unit 114 acquires driver related information to be used for identifying the driver of the vehicle A. The driver related information is, for example, driver's biological information. The driver related information acquisition unit 114 captures an image of a driver's face by using the interior-imaging camera, for example, and acquires position information of his/her eyes, nose, mouth, and the like, that is, driver's biological information, as the driver related information. The driver related information acquisition unit 114 transmits the acquired driver related information to the rule management device 30.

Note that the driver related information acquisition unit 114 may acquire driver's biological information by using a biometric authentication device (not illustrated) or may acquire, as the driver related information, identification information, such as a driver's personal number, input via the input unit 130.

The vehicle warning reception unit 115 receives vehicle warning transmitted from the drive assist device 20. The vehicle warning is transmitted from the drive assist device 20 when a vehicle state is in a predetermined state. This will be described later in detail. A type of vehicle warning is specified in the received vehicle warning.

The output determination unit 116 determines whether or not to output warning to output devices, such as displays and the seat vibration function 403, included in the warning output device 10 or connected to the warning output device 10. Upon receipt of vehicle warning from the drive assist device 20, the output determination unit 116 outputs information related to the vehicle warning to the driver.

The output determination unit 116 determines whether or not the driver's state acquired by the driver's state acquisition unit 113 corresponds to any driver factor. For the determination, driver factor definition information (not illustrated) stored in the storage unit 120 in advance may be used. When a driver factor is detected and the vehicle state satisfies a predetermined condition specified by individual adaptive rule information, the output determination unit 116 determines to output driver factor warning for calling attention related to the driver factor.

Note that when inattentive driving is detected as a driver factor, the output determination unit 116 outputs, as driver factor warning, inattentive drive warning for calling attention against inattentive driving.

The storage unit 120 stores individual adaptive rule information 121, output warning information 122, and output specification information 123. The individual adaptive rule information 121 is information generated for the driver of the vehicle A and is acquired by transmitting the identification information of the driver to the rule management device 30. The output warning information 122 indicates details of information to be output to the output devices. The output specification information 123 is information in which output identification information for identifying information to be output is associated with vehicle warning, a driver factor, or a combination of vehicle warning and a driver factor.

The drive assist device 20 includes a control unit 210 and a communication unit 220. The control unit 210 performs centralized control of the entire drive assist device 20. The communication unit 220 relays transmission and reception of vehicle warning to and from the warning output device 10.

The control unit 210 includes a state detection unit 211 and a vehicle warning report unit 212. The state detection unit 211 detects a vehicle state by using the exterior-imaging camera 401. When the vehicle state detected by the state detection unit 211 is a state determined in advance as a warning factor, the vehicle warning report unit 212 transmits vehicle warning, a type of the vehicle warning being specified in the vehicle warning, to the warning output device 10. For example, when the distance to a front vehicle is equal to or shorter than a predetermined distance, the vehicle warning report unit 212 reports vehicle warning. The vehicle warning report unit 212 reports the vehicle state detected by the state detection unit 211 to the warning output device 10.

The rule management device 30 includes a control unit 310, a storage unit 320, and a communication unit 330. The control unit 310 performs centralized control of the entire rule management device 30. The storage unit 320 stores information necessary for management of individual adaptive rule information 322 by the rule management device 30. The communication unit 330 relays transmission and reception of information to and from the warning output device 10.

The control unit 310 includes an information generation unit 311, an individual adaptive rule transmission unit 312, and a driver identifying unit 313. When the warning output device 10 receives vehicle warning from the drive assist device 20 and a driver factor including inattentive driving of the driver of the vehicle A provided with the warning output device 10 is detected, the information generation unit 311 generates individual adaptive rule information 322 associated with the identification information of the driver. The individual adaptive rule information 322 includes the type of the vehicle warning received by the warning output device 10.

The information generation unit 311 associates, with the individual adaptive rule information 322, a threshold for the vehicle state corresponding to the type of the vehicle warning, the threshold being stored in a region (not illustrated) of the storage unit 320.

The individual adaptive rule transmission unit 312 identifies a driver by using driver related information transmitted from the warning output device 10 and transmits the individual adaptive rule information 322 generated for the driver, to the warning output device 10. The driver identifying unit 313 refers to driver information to be described later, by using the driver related information from the warning output device 10, to thereby identify identification information of the driver. The individual adaptive rule transmission unit 312 identifies the individual adaptive rule information 322 of the driver by using the identification information of the driver.

The storage unit 320 stores the vehicle warning detection information 321, the individual adaptive rule information 322, and driver information 323. The vehicle warning detection information 321 is information generated when the warning output device 10 receives vehicle warning and includes the type of the vehicle warning, the vehicle state at the time of receiving the vehicle warning, and the like.

The individual adaptive rule information 322 is information generated for each driver related to each warning output device 10 and includes types of vehicle warning. The individual adaptive rule information 322 stored in the storage unit 320 of the rule management device 30 is information generated for each driver of each of vehicles A including one or a plurality of warning output devices 10 connected to the rule management device 30. In contrast, the individual adaptive rule information 121 stored in the storage unit 120 of each warning output device 10 is information generated for the driver of the vehicle A including the warning output device 10.

The driver information 323 is information in which driver related information, such as biological information, received from the warning output device 10 and the identification information of the driver are associated with each other. By referring to the driver information 323 by using the driver related information received from the warning output device 10, the identification information of the driver can be identified.

Figure 2:
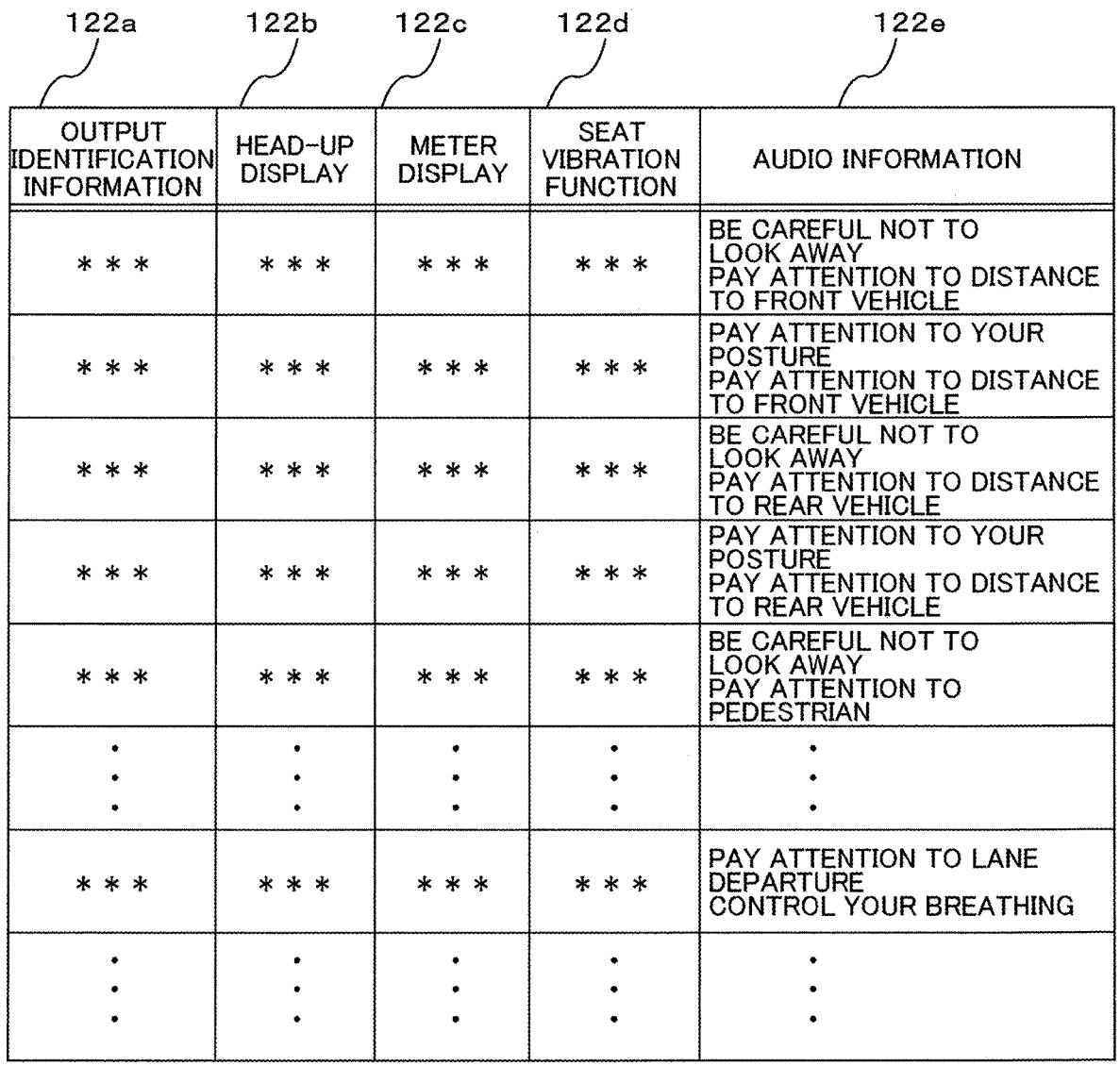
FIG. 2 is a diagram illustrating an example of a data structure of output warning information.

FIG. 2 is a diagram illustrating an example of a data structure of the output warning information 122. The output warning information 122 includes output identification information 122a, a head-up display 122b, a meter display 122c, a seat vibration function 122d, and audio information 122e.

The output identification information 122a is identification information for identifying each record of the output warning information 122. The head-up display 122b is identification information for specifying information to be displayed on the head-up display 405. The meter display 122c is identification information for specifying information to be displayed on the meter display 406. The seat vibration function 122d is identification information for specifying a vibration pattern of the seat vibration function 403. The audio information 122e is information for specifying audio information to be output via the speaker 404.

For example, when the warning output device 10 determines to output the output identification information 122a included in the top record in the output warning information 122 illustrated in FIG. 2, information specified by the head-up display 122b and the meter display 122c included in the record is output. Moreover, the seat vibration function 403 vibrates in the vibration pattern specified by the seat vibration function 122d included in the same record. Furthermore, the audio information 122e producing a speech sound of "Be careful not to look away. Pay attention to the distance to the front vehicle." is output via the speaker 404.

Figure 3:
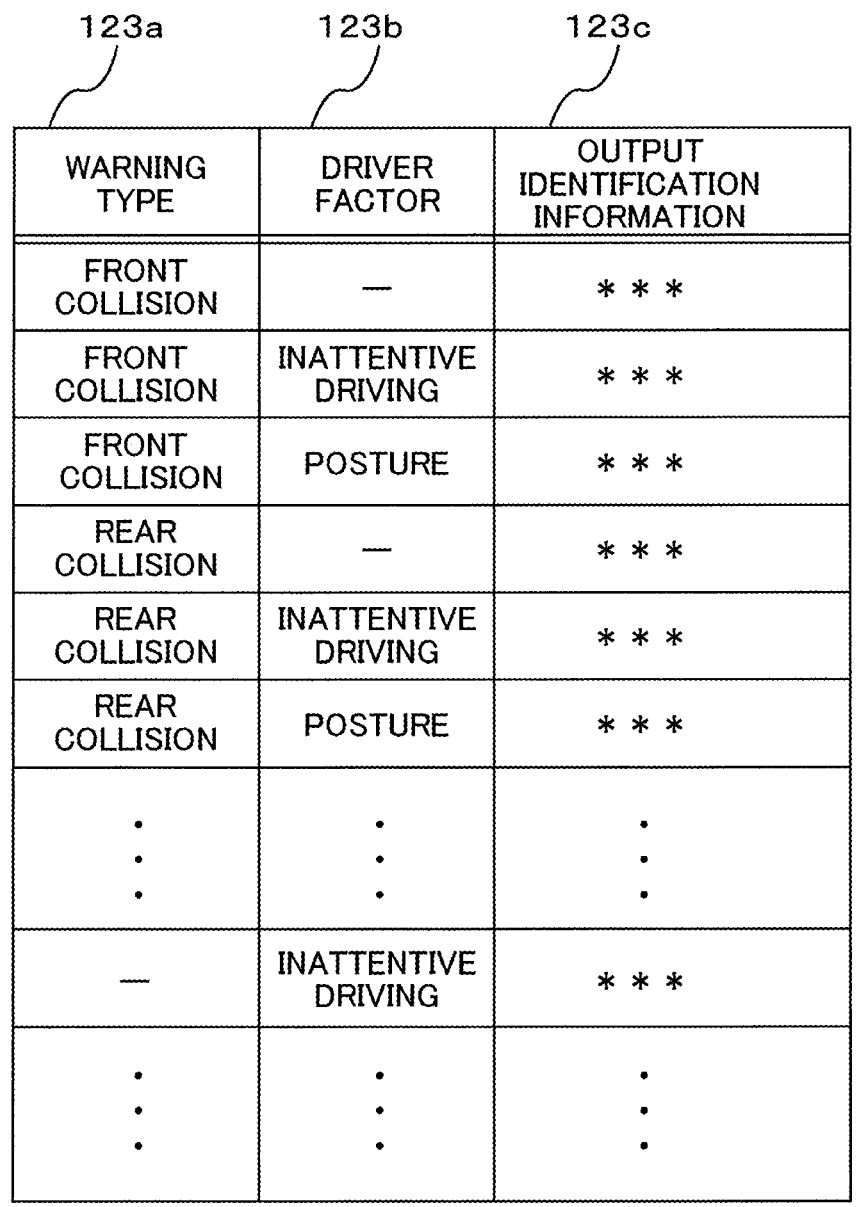
FIG. 3 is a diagram illustrating an example of a data structure of output specification information.

FIG. 3 is a diagram illustrating an example of a data structure of the output specification information 123. The output specification information 123 includes a warning type 123a, a driver factor 123b, and output identification information 123c. The warning type 123a is information indicating a type of vehicle warning. The driver factor 123b is information indicating a driver factor. The output identification information 123c is identification information for identifying information to be output to the output device.

FIG. 4 is a diagram (part 1) illustrating an example of a data structure of the vehicle warning detection information 321. The vehicle warning detection information 321 includes driver identification information 321a, detection identification information 321b, vehicle warning 321c, and a surrounding state at occurrence of vehicle warning 321d.

The driver identification information 321a is identification information for identifying the driver of the vehicle A including the warning output device 10 that has received vehicle warning. The detection identification information 321b is identification information for identifying a record in the vehicle warning detection information 321. The vehicle warning 321c is information indicating the type of the vehicle warning received by the warning output device 10.

The vehicle warning 321c includes, as types, information such as "front collision", "rear collision", "pedestrian", "bicycle", "drifting", and "lane departure". "Front collision" is a type of vehicle warning in a case of detecting a warning factor in which the vehicle distance between the vehicle A and a vehicle in front of the vehicle A is equal to or shorter than a predetermined distance; "pedestrian" is a type of vehicle warning when the distance between the vehicle A and a pedestrian is equal to or shorter than a predetermined distance.

The surrounding state at occurrence of vehicle warning 321d is information indicating the state surrounding the vehicle A at the time of receiving the vehicle warning by the warning output device 10. The state surrounding the vehicle A includes information such as road type and position of own vehicle. Note that the information such as the road type and the position of the own vehicle is identifiable by the warning output device 10 referring to map information stored in a region (not illustrated) of the storage unit 120 and position information of the vehicle A obtained by using a positioning signal receiver to be described later. Note that the map information is high-definition map information in which data of positions of traffic lanes, stop lines, curbs, pedestrian crossings, and traffic signs, for example, is recorded with an accuracy having errors within several centimeters.

FIG. 5 is a diagram (part 2) illustrating an example of a data structure of the vehicle warning detection information 321. The vehicle warning detection information 321 illustrated in FIG. 5 constitutes single vehicle warning detection information 321 together with the vehicle warning detection information 321 illustrated in FIG. 4. In the vehicle warning detection information 321 illustrated in FIG. 5, each record is identified by the detection identification information 321b similarly to the vehicle warning detection information 321 illustrated in FIG. 4.

A surrounding state at occurrence of vehicle warning 321d illustrated in FIG. 5 includes information indicating state of surrounding vehicles, state of own vehicle, and presence and/or absence of pedestrians and bicycles. The information indicating state of surrounding vehicles, state of own vehicle, and presence and/or absence of pedestrians and bicycles is identifiable by referring to the information indicating a vehicle state acquired from the drive assist device 20, for example.

The vehicle warning detection information 321 includes a driver's state 321e. The driver's state 321e includes an interior-imaging camera 3211 and biological information 3212. The interior-imaging camera 3211 includes information identifiable by using the interior-imaging camera, such as detection of inattentive driving and detection of inappropriate posture. The biological information 3212 includes information identifiable by using, for example, a biological sensor, such as a driver's pulse rate and breathing rate.

FIG. 6 is a diagram illustrating an example of a data structure of the individual adaptive rule information 322. The individual adaptive rule information 322 includes driver identification information 322a, vehicle warning type 322b, rule identification information 322c, driver factor 322d, detection identification information 322e, output identification information 322f, and threshold information 322g.

The driver identification information 322a is identification information for identifying the driver of the vehicle A. The vehicle warning type 322b is information for identifying the type of vehicle warning transmitted from the drive assist device 20. The rule identification information 322c is identification information for identifying a record in the individual adaptive rule information 322. The driver factor 322d is information indicating a driver factor detected when vehicle warning is transmitted. The driver factor 322d is information indicating, for example, detection of inattentive driving, detection of inappropriate posture, and so on.

The detection identification information 322e is information for identifying a record in the vehicle warning detection information 321 and corresponds to the detection identification information 321b of the vehicle warning detection information 321. The output identification information is information 322f for identifying a record in the output warning information 122 and corresponds to the output identification information 122a of the output warning information 122. The threshold information 322g is information indicating a threshold for a vehicle state.

Note that whether or not to output warning information due to the driver factor is determined based on the threshold information 322g. In other words, the threshold information 322g is considered as information indicating a condition for whether or not to output driver factor warning. When the vehicle state acquired by the vehicle state acquisition unit 112 is within a numerical range specified by the threshold information 322g, warning information corresponding to the driver factor is output.

Additionally, the individual adaptive rule information 121 stored in the warning output device 10 may be similar to the individual adaptive rule information 121 indicated in FIG. 6 or may not necessarily include the driver identification information 322a in the individual adaptive rule information 322 indicated in FIG. 6. This is because the individual adaptive rule information 121 stored in the warning output device 10 is information indicating a rule related to a specific driver who drives the vehicle A.

Figure 7:
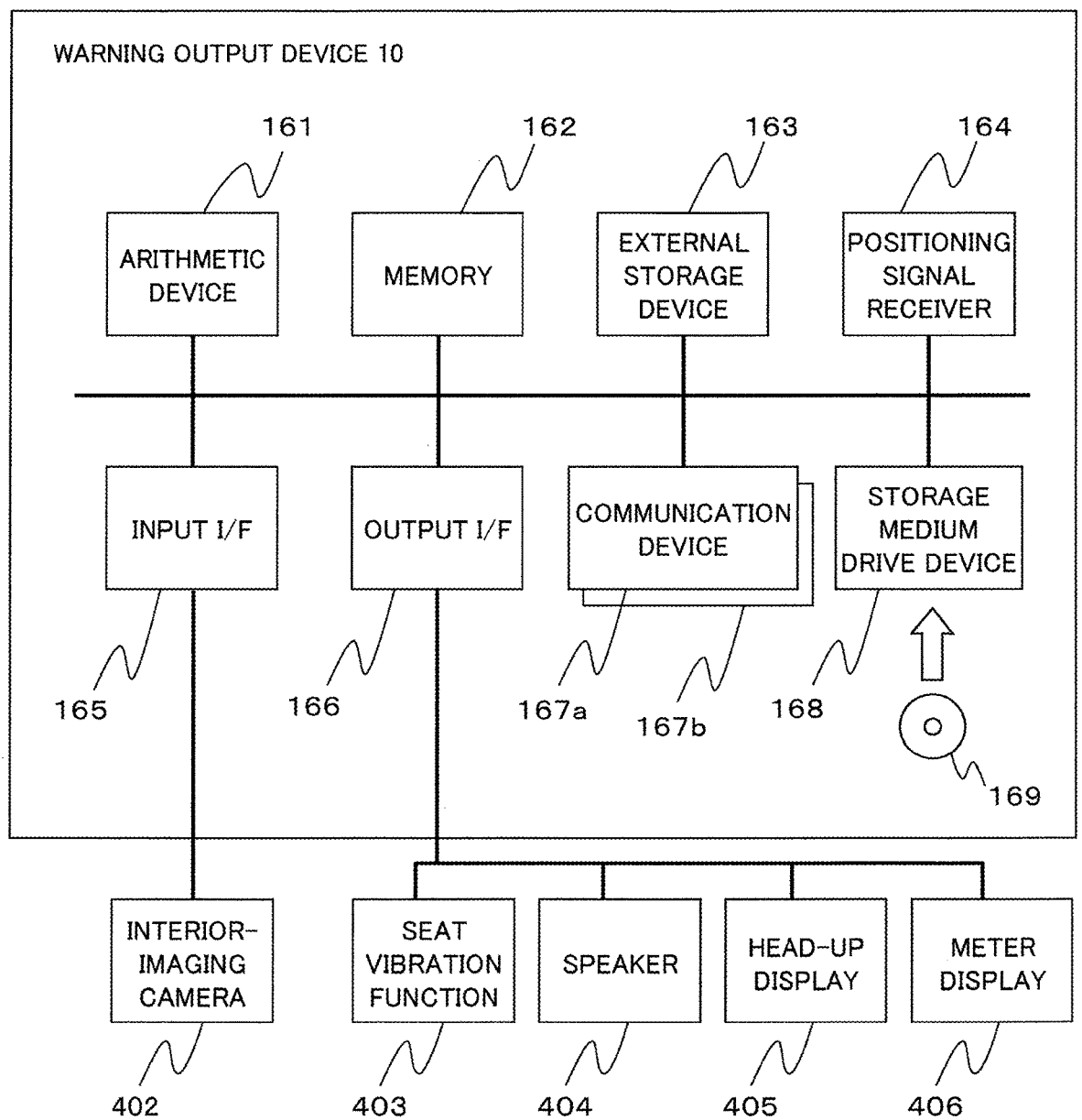
FIG. 7 is a diagram illustrating an example of a hardware configuration of a warning output device.

FIG. 7 is a diagram illustrating an example of a hardware configuration of the warning output device 10. The warning output device 10 includes an arithmetic device 161, a memory 162, an external storage device 163, a positioning signal receiver 164, an input interface (I/F) 165, an output I/F 166, a communication device 167a, a communication device 167b, and a storage medium drive device 168. These components are connected to each other by a bus.

The arithmetic device 161 is a central arithmetic device, such as a central processing unit (CPU), and performs processing according to a program recorded in the memory 162 or the external storage device 163. When the arithmetic device 161 performs the program, each processing unit included in the control unit 110 implements a corresponding function.

The memory 162 is a storage device, such as random access memory (RAM) or a flash memory, and functions as a storage area in which a program and data are temporarily read out. For example, the external storage device 163 is a writable and readable storage medium, such as a hard disk drive (HDD).

The positioning signal receiver 164 is a device that can receive positioning signals from the Global Positioning System (GPS) or the Quasi-Zenith Satellite System, which is used to calculate the present position with higher precision than that of the GPS. The positioning signal receiver 164 measures the present location, the traveling speed and the traveling direction of a mobile unit.

The input I/F 165 is an interface for connecting to an input device (not illustrated) that receives input operation from a user such as a driver. For example, the input I/F 165 receives an input from a touch panel, a microphone, or the like. The input I/F 165 receives an input of information related to a state inside the vehicle such as a driver's line of sight and information such as the position of an object outside the vehicle, from the interior-imaging camera 402.

The output I/F 166 is an interface for outputting information to the output device. To the output I/F 166, output devices including the seat vibration function 403, the speaker 404, the head-up display 405, and the meter display 406 are connected. Note that other output devices (e.g., a touch panel) included in the warning output device 10 may be connected to the output I/F 166.

The communication device 167a is a device for connecting the warning output device 10 to an in-vehicle network and is a communication device in conformity to a communication standard, such as a controller area network (CAN), for example. Note that the warning output device 10 and the drive assist device 20 may be directly connected through a connection interface instead of being connected through the in-vehicle network. The function of the in-vehicle communication unit 150 is implemented with the communication device 167a. The communication device 167b is a device for connecting the warning output device to a network outside the vehicle. The function of the external communication unit 160 is implemented with the communication device 167b.

The storage medium drive device 168 is a device that inputs and outputs information to and from a portable medium 169, such as a compact disk (CD) and a digital versatile disk (DVD). The function of the storage unit 120 is implemented with the memory 162 or the external storage device 163. The function of the storage unit 120 may be implemented with a storage device on a network.

Figure 8:
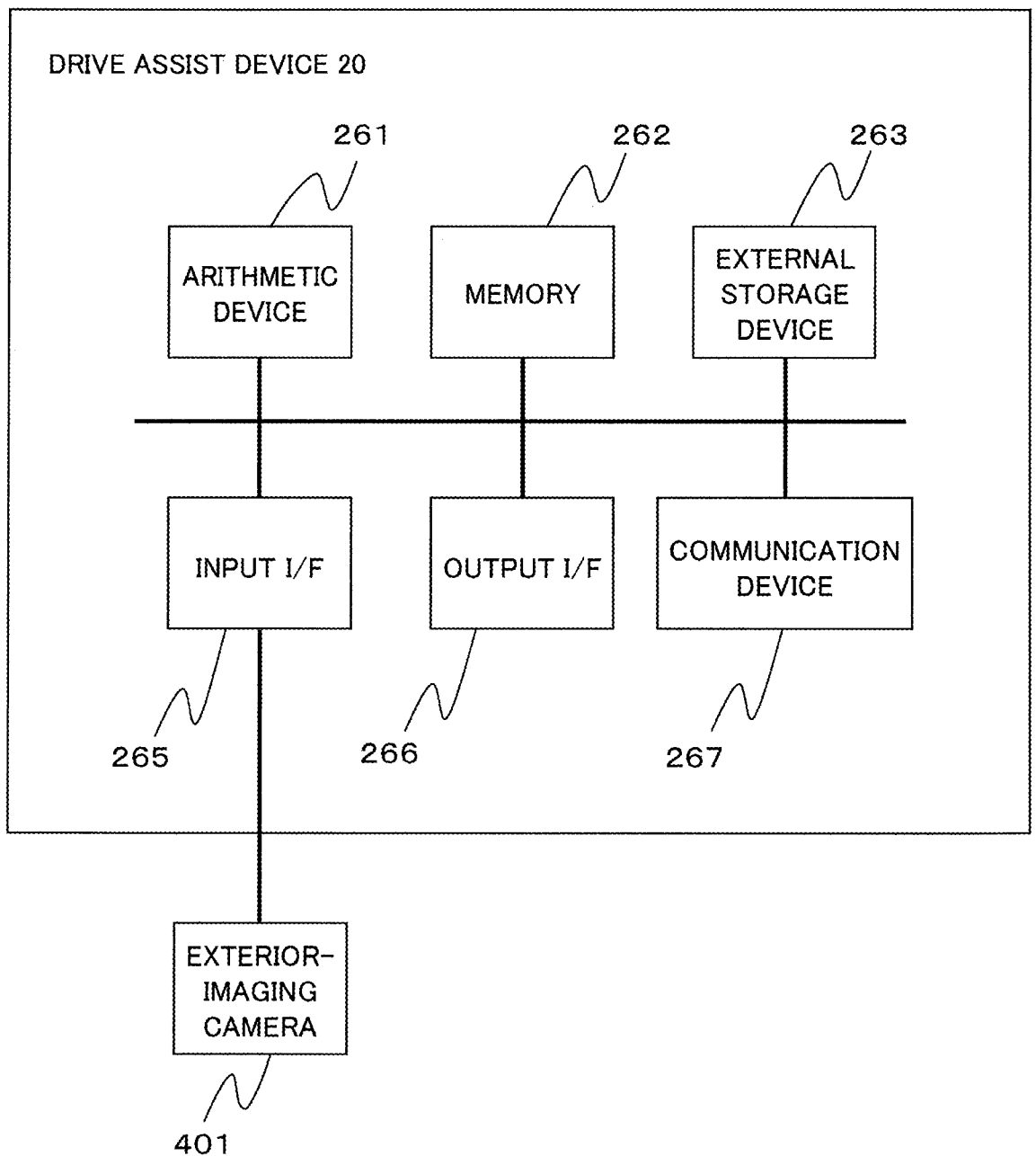
FIG. 8 is a diagram illustrating an example of a hardware configuration of a drive assist device.

FIG. 8 is a diagram illustrating an example of a hardware configuration of the drive assist device 20. The drive assist device 20 includes an arithmetic device 261, a memory 262, an external storage device 263, an input I/F 265, an output I/F 266, and a communication device 267. These components are connected to each other by a bus.

The arithmetic device 261, the memory 262, the external storage device 263, the input I/F 265, the output I/F 266, and the communication device 267 are similar to the arithmetic device 161, the memory 162, the external storage device 163, the input I/F 165, the output I/F 166, and the communication device 167a included in the warning output device 10, and hence descriptions thereof are omitted. Note that the drive assist device 20 may include a positioning signal receiver and a storage medium drive device.

Figure 9:
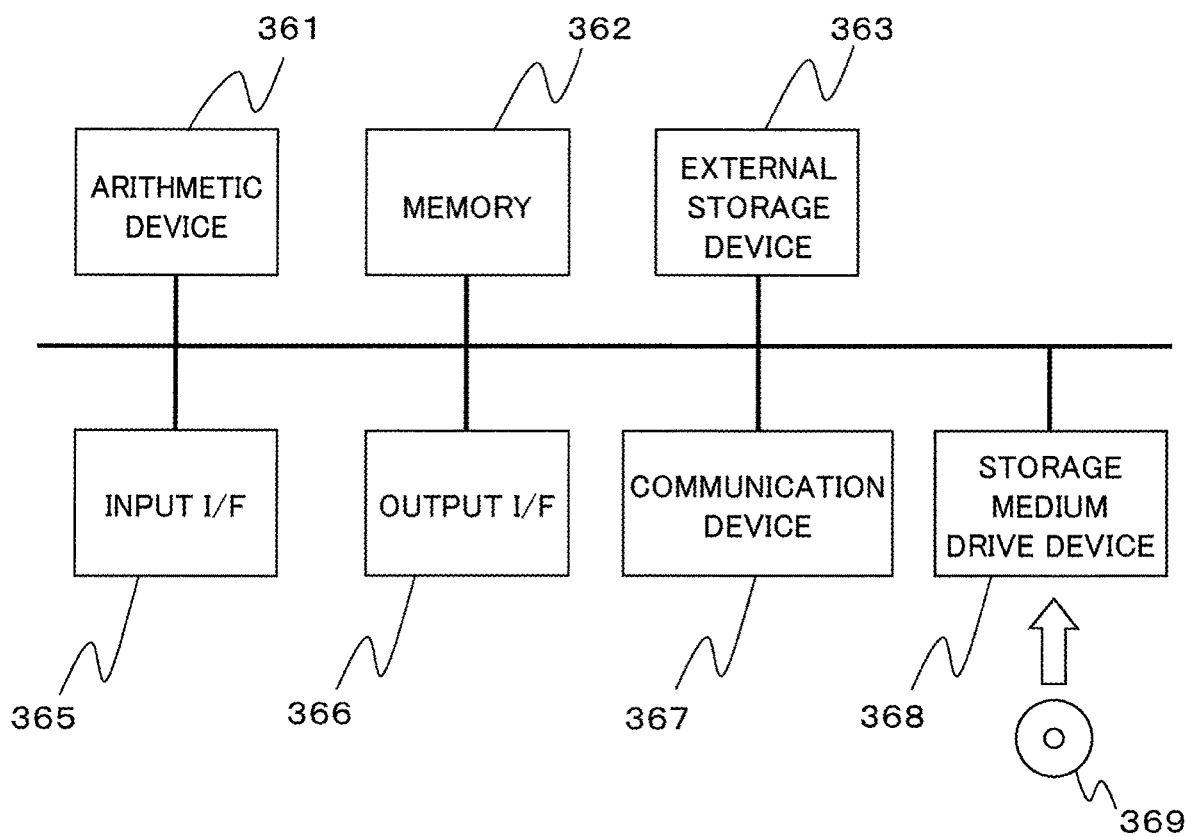
FIG. 9 is a diagram illustrating an example of a hardware configuration of a rule management device.

FIG. 9 is a diagram illustrating an example of a hardware configuration of the rule management device 30. The rule management device 30 includes an arithmetic device 361, a memory 362, an external storage device 363, an input I/F 365, an output I/F 366, a communication device 367, and a storage medium drive device 368. These components are connected to each other by a bus.

The arithmetic device 361, the memory 362, the external storage device 363, the input I/F 365, the output I/F 366, the communication device 367, and the storage medium drive device 368 are similar to the arithmetic device 161, the memory 162, the external storage device 163, the input I/F 165, the output I/F 166, the communication device 167b, and the storage medium drive device 168 included in the warning output device 10, and hence descriptions thereof are omitted.

Note that processing of each of the components of the warning output device 10, the drive assist device 20, and the rule management device 30 may be performed by one piece of hardware, or may be performed by a plurality of pieces of hardware. Processing of each of the components of the warning output device 10, the drive assist device 20, and the rule management device 30 may be implemented by one program, or may be implemented by a plurality of programs.

Figure 10:
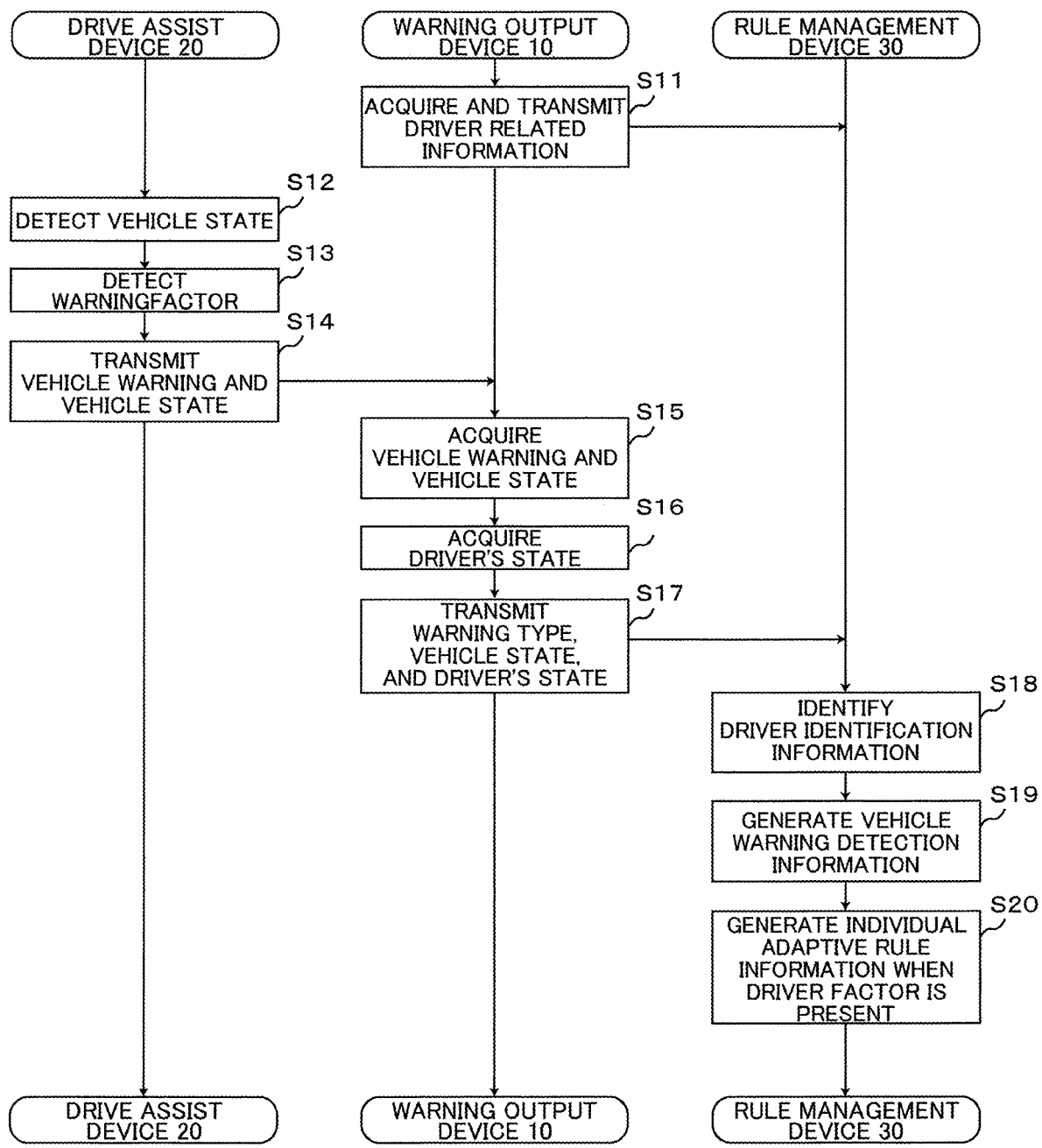
FIG. 10 is a sequence diagram illustrating an example of processing for generating individual adaptive rule information stored in a storage unit in the rule management device.

FIG. 10 is a sequence diagram illustrating an example of processing for generating the individual adaptive rule information 322 stored in the storage unit 320 of the rule management device 30.

First, the driver related information acquisition unit 114 of the warning output device 10 acquires driver related information and transmits the driver related information to the rule management device 30 (Step S11). The driver related information acquisition unit 114 acquires the driver related information, such as driver's biological information, by using the interior-imaging camera 402 and transmits the driver related information to the rule management device 30. Note that, as described previously, the vehicle state acquisition unit 112 simply needs to acquire information that can identify the driver, and the information to be acquired is not limited to any.

Next, the state detection unit 211 of the drive assist device 20 detects a vehicle state (Step S12). The state detection unit 211 detects a vehicle state of the vehicle A by using the exterior-imaging camera 401.

Next, the vehicle warning report unit 212 of the drive assist device 20 detects a warning factor (Step S13). Specifically, the vehicle warning report unit 212 determines whether or not the vehicle state detected in Step S12 is a state determined in advance as a warning factor. When the vehicle warning report unit 212 determines that the vehicle state corresponds to a state defined as a warning factor, the vehicle warning report unit 212 advances the processing to the next step.

Note that, when the vehicle warning report unit 212 determines that the vehicle state does not correspond to any warning factor, the vehicle warning report unit 212 returns the processing to Step S12. In other words, the state detection unit 211 repeats the processing in Step S12 until it is determined that the vehicle state corresponds to a warning factor.

Next, the vehicle warning report unit 212 transmits vehicle warning and the vehicle state (Step S14). Specifically, the vehicle warning report unit 212 identifies the type of warning of the vehicle state determined to correspond to a warning factor in Step S13 and transmits vehicle warning including the type to the warning output device 10. Note that the type of warning is identifiable by referring to definition information for the warning factor stored in the storage unit (not illustrated) of the drive assist device 20. The vehicle warning report unit 212 also transmits the vehicle state detected in Step S12 to the warning output device 10.

Next, the vehicle state acquisition unit 112 of the warning output device 10 acquires the vehicle warning and the vehicle state of the vehicle A (Step S15). Specifically, the vehicle state acquisition unit 112 acquires the vehicle warning transmitted in Step S14 and the vehicle state such as a state of the outside and the traveling state of the vehicle A. The vehicle state acquisition unit 112 acquires, as the vehicle state, information indicating a surrounding state indicating the type of the road on which the vehicle A is traveling, the positions of lanes, and the like, by using the positioning signal receiver 164 included in the warning output device 10, map information (not illustrated), and the like.

Note that the information related to the state of the outside and the traveling state of the vehicle A and the like may be acquired by the vehicle state acquisition unit 112 of the warning output device 10 by using the exterior-imaging camera 401 connected to the warning output device 10 and the like, instead of receiving the information from the drive assist device 20.

Next, the driver's state acquisition unit 113 of the warning output device 10 acquires a driver's state (Step S16). Specifically, the driver's state acquisition unit 113 determines a driver's line of sight and posture by using the interior-imaging camera 402 to detect the presence or absence of inattentive drive and inappropriate posture. The driver's state acquisition unit 113 may acquire, as the driver's state, biological information such as a driver's pulse rate and breathing rate, by using a biological sensor and the like. Note that the driver's state may be that included in the information transmitted from the drive assist device 20 in Step S14 and indicating the vehicle state. In this case, the state detection unit 211 of the drive assist device 20 acquires the driver's state by using an interior-imaging camera and the like connected to the drive assist device 20.

Next, the vehicle warning reception unit 115 transmits the warning type, the vehicle state, and the driver's state to the rule management device 30 (Step S17). Specifically, the vehicle warning reception unit 115 transmits, to the rule management device 30, the type of the vehicle warning and the vehicle state acquired in Step S15 and the driver's state acquired in Step S16.

Next, the driver identifying unit 313 of the rule management device 30 identifies identification information of the driver (Step S18). Specifically, the driver identifying unit 313 refers to the driver information 323 by using the driver related information transmitted from the warning output device 10 in Step S11, to thereby identify identification information of the driver. Note that, when no identification information corresponding to the driver related information transmitted in Step S11 exists in the driver information 323, the driver identifying unit 313 generates, by assuming that the driver related information is information of a driver which is not registered yet, new identification information and stores the generated identification information in the driver information 323 in association with the transmitted driver related information.

Next, the information generation unit 311 of the rule management device 30 generates the vehicle warning detection information 321 (Step S19). Specifically, the information generation unit 311 generates the vehicle warning detection information 321 in association with the warning type, the vehicle state, and the driver's state acquired in Step S17 and the identification information of the driver identified in Step S18, and stores the vehicle warning detection information 321 in the storage unit 320. Specifically, the information generation unit 311 generates the detection identification information 321b that is new, and generates the vehicle warning detection information 321 by associating with each other the identification information of the driver as the driver identification information 321a, the warning type as the vehicle warning 321c, the vehicle state as the surrounding state at occurrence of vehicle warning 321d, and the driver's state as the driver's state 321e.

Next, when a driver factor is present, the information generation unit 311 generates the individual adaptive rule information 322 (Step S20). Specifically, the information generation unit 311 refers to the driver's state 321e in the vehicle warning detection information 321 generated in Step S19, to determine whether or not a driver's state that is inappropriate for driving is present. For example, when information indicating that inattentive driving is detected or information indicating that inappropriate posture is detected is included in the driver's state 321e, the information generation unit 311 determines that a driver factor is present. Note that a criterion, such as an upper limit value of the breathing rate, for example, defined in advance in a region (not illustrated) of the storage unit 320 may be used for the determination of the presence or absence of a driver factor.

When the information generation unit 311 determines that a driver factor is present, the information generation unit 311 generates the individual adaptive rule information 322 by using the vehicle warning detection information 321 generated in Step S19. More specifically, the rule management device 30 includes, in the storage unit 320, definition information (not illustrated) in which output identification information for identifying information to be output and threshold information to serve as a condition for outputting the information are associated in advance, with each combination of a warning type and a driver factor.

The information generation unit 311 refers to the definition information to identify the output identification information and threshold information associated with the combination of the driver factor and the warning type included in the vehicle warning detection information 321 generated in Step S19. The information generation unit 311 associates with each other the detection identification information 321b, the vehicle warning 321c, and the driver's state 321e indicating the driver factor, which are included in the vehicle warning detection information 321, the output identification information and the threshold information thus identified, and the driver identification information identified in Step S18, and adds the rule identification information 322c that is new, to thereby generate the individual adaptive rule information 322. The drive assist device 20, the warning output device 10, and the rule management device 30 thereafter terminate the processing of this sequence diagram.

Note that the information generation unit 311 associates in advance the date and time of generation with each of the records in the individual adaptive rule information 322. The information generation unit 311 deletes each record of the individual adaptive rule information 322 having the date and time of generation from which a predetermined time period has elapsed, for example.

According to the present embodiment, when warning related to a vehicle state is output from the drive assist device 20 and a driver factor, such as inattentive driving, is detected, a record of the detected state can be held.

Figure 11:
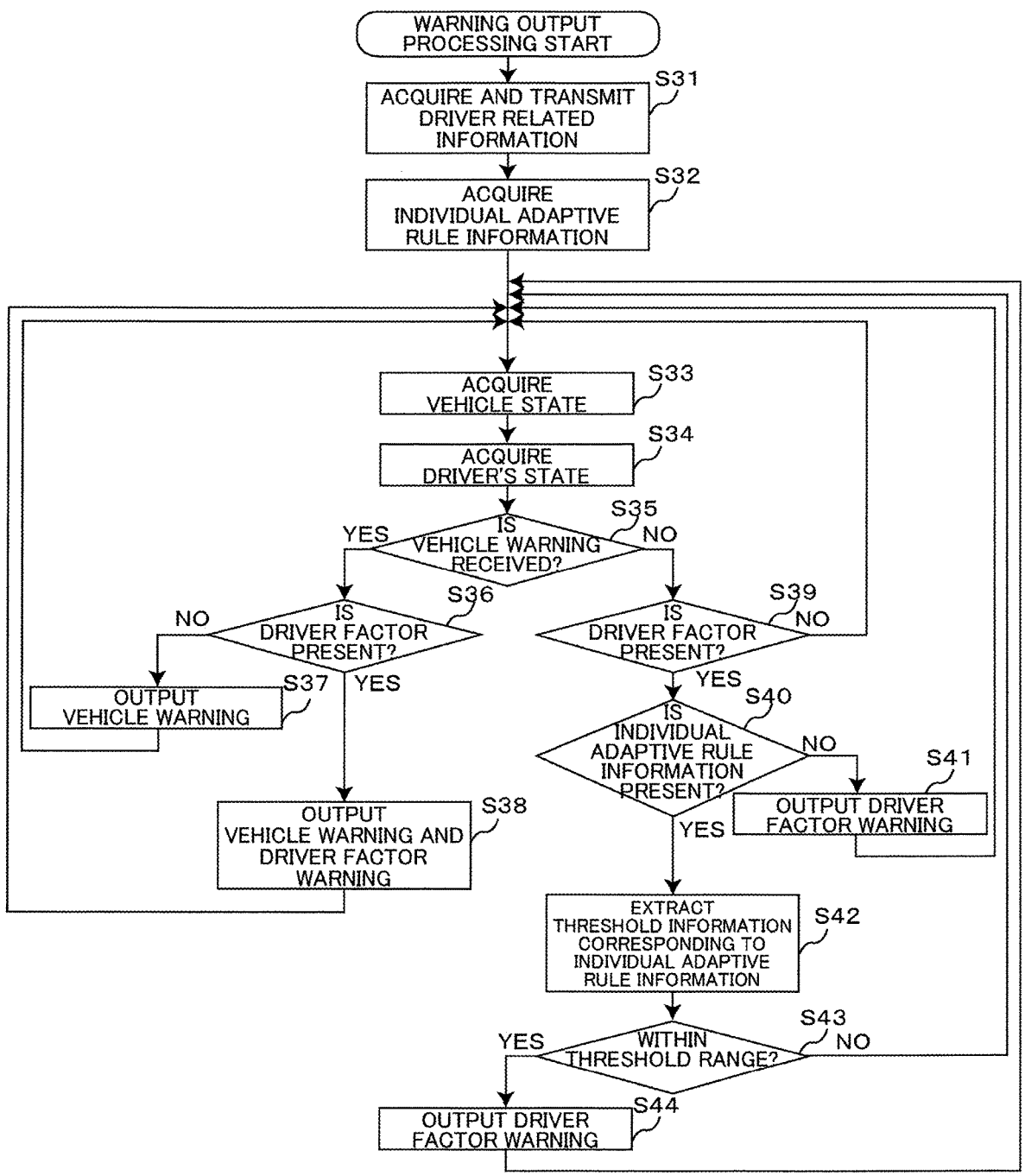
FIG. 11 is a flowchart illustrating an example of warning output processing in the warning output device.

FIG. 11 is a flowchart illustrating an example of warning output processing in the warning output device 10. The processing in the flowchart is started, for example, when the warning output device 10 is turned on.

First, the vehicle state acquisition unit 112 acquires driver related information and transmits the driver related information to the rule management device 30 (Step S31). The processing performed in this step is similar to the processing performed in Step S11 illustrated in FIG. 10, and hence description of the processing is omitted.

Note that, as described previously, the driver identifying unit 313 of the rule management device 30 identifies identification information of the driver by using received driver related information (similar to Step S18 described above). The individual adaptive rule transmission unit 312 thereafter identifies the individual adaptive rule information 322 including the identification information and transmits the individual adaptive rule information 322 to the warning output device 10.

Next, the individual adaptive rule acquisition unit 111 acquires the individual adaptive rule information 121 (Step S32). Specifically, the individual adaptive rule acquisition unit 111 receives the individual adaptive rule information 322 generated for the driver identifiable based on the driver related information transmitted in Step S31 and stores the individual adaptive rule information 322 as the individual adaptive rule information 121 in the storage unit 120. Note that, when the individual adaptive rule information 322 for the driver of the vehicle A has not been generated in the rule management device 30, the individual adaptive rule information 121 is not acquired in this step.

The processing in Step S31 and Step S32 may be performed periodically in the warning output device 10.

Next, the vehicle state acquisition unit 112 acquires a vehicle state (Step S33). Specifically, the vehicle state acquisition unit 112 acquires a vehicle state transmitted from the vehicle warning report unit 212 of the drive assist device 20. The vehicle state acquisition unit 112 may acquire a vehicle state by using the positioning signal receiver 164 included in the vehicle state acquisition unit 112, map information (not illustrated), and the like, similarly to Step S15 illustrated in FIG. 10 described above.

Next, the vehicle state acquisition unit 112 acquires a driver's state (Step S34). The processing performed in Step S34 is similar to the processing performed in Step S16 illustrated in FIG. 10, and hence description of the processing is omitted. Note that the processing in Step S33 and Step S34 may be, for example, performed periodically in the warning output device 10.

Next, the vehicle warning reception unit 115 determines whether or not vehicle warning is received (Step S35). The vehicle warning reception unit 115 determines whether or not vehicle warning transmitted from the drive assist device 20 upon detection of a warning factor is received. Note that, when the vehicle warning reception unit 115 determines that vehicle warning is received, the vehicle warning detection information 321 is generated in the rule management device 30 as described previously (Step S19 in FIG. 10).

When the vehicle warning reception unit 115 determines that vehicle warning is received ("YES" in Step S35), the output determination unit 116 determines whether or not a driver factor is present (Step S36). Specifically, the output determination unit 116 refers to the driver's state acquired in Step S34 and determines whether or not a driver's state corresponding to a driver factor is detected, for example, inattentive driving is detected or inappropriate posture is detected.

When the output determination unit 116 determines that no driver factor is present (in a case of "NO" in Step S36), the output unit 140 outputs vehicle warning (Step S37). Specifically, when the output determination unit 116 determines that no driver factor is present, the output determination unit 116 refers to the output specification information 123 by using the information indicating the type of warning included in the vehicle warning acquired in Step S35, to identify the record including the type in the warning type 123a and including the driver factor 123b indicating that no driver factor is present. The output determination unit 116 identifies the output identification information 123c included in the record.

The output determination unit 116 causes the output unit 140 to output warning information indicating the vehicle warning, by using output information corresponding to the identified output identification information 123c in the output warning information 122. The control unit 110 thereafter returns the processing to Step S33.

Note that the state detection unit 211 of the drive assist device 20 monitors the vehicle state to be a factor of the vehicle warning transmitted to the warning output device 10, to detect whether or not the warning factor is eliminated. When it is detected that the warning factor is eliminated, the vehicle warning reception unit 115 receives information indicating that the warning factor is eliminated. When the vehicle warning reception unit 115 receives the information, the output determination unit 116 stops the output of the warning information.

FIG. 12 is a diagram (part 1) illustrating an example of the output information. FIG. 12 illustrates an example of output information in a case where vehicle warning is transmitted from the drive assist device 20 and no driver factor is present. FIG. 12A illustrates a vehicle state of this example. Since the vehicle A is approaching a front vehicle to consequently have a distance to the front vehicle of a predetermined distance or shorter, the drive assist device 20 transmits vehicle warning with a type "front collision" to the warning output device 10.

FIG. 12B is an example of display on the head-up display 405 in this example. A display screen 1711 of the head-up display 405 includes a display area 1712. Warning information indicating what is to be warned is displayed in the display area 1712. In this example, the output determination unit 116 refers to the storage unit 120, to identify a character string representing "Pay attention to vehicle distance" as the vehicle warning and thereby display the character string in the display area 1712.

FIG. 12C is an example of display of the meter display 406 in this example. A display screen 1721 of the meter display 406 includes a display area 1722. For example, information describing a state being a factor of the warning is displayed in the display area 1722. In this example, since the vehicle warning reception unit 115 has received the vehicle warning with the type of "front collision", the output determination unit 116 refers to the storage unit 120 to thereby identify the output information indicating a state being a factor of "front collision" and display the output information in the display area 1722. A state where the vehicle A is approaching the front vehicle is displayed in the display area 1722 in FIG. 12C.

FIG. 13 is a diagram (part 2) illustrating an example of the output information. FIG. 13 illustrates a different example of the output information in a case where vehicle warning is transmitted from the drive assist device 20 and no driver factor is present. FIG. 13A illustrates a vehicle state of this example. Since the vehicle A is approaching a pedestrian to consequently have a distance to the pedestrian of a predetermined distance or shorter, the drive assist device 20 transmits vehicle warning with a type "pedestrian" to the warning output device 10.

FIG. 13B is an example of display on the head-up display 405 in this example. A character string representing "Pay attention to pedestrian" is displayed in the display area 1712 of the head-up display 405 as vehicle warning. FIG. 13C is an example of display of the meter display 406 in this example. A state in which the vehicle A is approaching the pedestrian is displayed in the display area 1722 as information for describing a state being a warning factor.

Turn the description back to FIG. 11. In Step S36, when the output determination unit 116 determines that a driver factor is present (in a case of "YES" in Step S36), the output unit 140 outputs vehicle warning and driver factor warning (Step S38). Specifically, the output determination unit 116 refers to the individual adaptive rule information 121 acquired in Step S32 by using the information indicating the driver factor and the type of the vehicle warning. The output determination unit 116 identifies output identification information corresponding to the identified combination of the vehicle warning type and the driver factor.

Note that, when the combination of the vehicle warning type and the driver factor is not included in the individual adaptive rule information 121, the output determination unit 116 refers to the output specification information 123, to identify the output identification information 123c corresponding to the combination of the warning type 123a and the driver factor 123b.

The output determination unit 116 identifies, in the output warning information 122, the head-up display 122b, the meter display 122c, the seat vibration function 122d, and the audio information 122e corresponding to the identified output identification information 122a, and output the identified elements via the output unit 140. The control unit 110 thereafter returns the processing to Step S33.

In Step S35, when the vehicle warning reception unit 115 determines that vehicle warning is not received ("NO" in Step S35), the driver's state acquisition unit 113 determines whether or not a driver factor is present (Step S39). Processing performed in this step is similar to the processing performed in Step S36. Therefore, description of the processing is omitted.

When the vehicle warning reception unit 115 determines that no driver factor is present (in a case of "NO" in Step S39), the vehicle warning reception unit 115 returns the processing to Step S33.

When the vehicle warning reception unit 115 determines that driver factor is present ("YES" in Step S39), the output determination unit 116 determines whether or not the individual adaptive rule information 121 is present (Step S40). Specifically, the output determination unit 116 refers to the storage unit 120 to determine whether or not the individual adaptive rule information 121 of the driver is acquired, in Step S32.

When the output determination unit 116 determines that no individual adaptive rule information 121 is present (in a case of "NO" in Step S40), the output determination unit 116 outputs driver factor warning (Step S41). Note that, in the warning output device 10, a case where no individual adaptive rule information 121 of the driver is present is treated as a "normal mode", while a case where the individual adaptive rule information 121 is present is treated as an "individual adaption mode".

When the output determination unit 116 determines that no individual adaptive rule information 121 is present, in other words, in a case of the "normal mode", the output determination unit 116 refers to the output specification information 123 by using the driver's state to be a driver factor in the driver's state acquired in Step S34. The output determination unit 116 identifies a record including the driver factor in the driver factor 123b and not including any warning type in the warning type 123a. The output determination unit 116 refers to the output warning information 122 by using the output identification information 123c included in the record, to identify output information indicating warning against the driver factor. The output determination unit 116 outputs the identified output information via the output unit 140. The output determination unit 116 thereafter returns the processing to Step S33.

In this way, when a driver factor is detected in the case of the "normal mode", warning corresponding to the driver factor is output. This makes it possible to appropriately perform warning at an occurrence of a driver factor.

When the vehicle warning reception unit 115 determines that the individual adaptive rule information 121 is present ("YES" in Step S40), the output determination unit 116 extracts threshold information corresponding to the individual adaptive rule information 121 (Step S42). Specifically, when the individual adaptive rule information 121 is present, in other words, in the case of the "individual adaption mode", the output determination unit 116 refers to the individual adaptive rule information 121 by using the driver factor determined to be present in Step S39. The output determination unit 116 extracts threshold information corresponding to the driver factor.

Note that, when the driver factor in Step S39 is not included in the individual adaptive rule information 121, the output determination unit 116 outputs driver factor warning similarly to the case of the "normal mode".

Next, the output determination unit 116 determines whether or not the vehicle state is within a threshold range (Step S43). As described above, by referring to the threshold information included in one record, a numeric range to serve as a condition for outputting warning information related to the driver factor is identified. The output determination unit 116 compares the threshold information in the individual adaptive rule information 121 extracted in Step S42 and the vehicle state acquired in Step S33, to thereby determine whether or not the vehicle state of the vehicle A is a state for which driver factor warning is to be output.

This will be described in more detail by using the individual adaptive rule information 322 illustrated in FIG. 6. When "inattentive driving" is detected as a driver factor, each record including "inattentive driving" as the driver factor 322*d* is extracted in Step S42. For example, the top record in FIG. 6 includes a record including "front collision detection" as the vehicle warning type 322*b* and "inattentive driving" as the driver factor 322*d*. It is assumed that the threshold information 322*g* in this record stores information indicating that the "distance to a front vehicle is 20 m or shorter", for example. In this case, the numeric range for outputting warning information related to the driver factor being "inattentive driving" is the "distance to a front vehicle is 0 m or longer and 20 m or shorter".

Similarly, the threshold information 322*g* of the individual adaptive rule information including "rear collision detection" as the vehicle warning type 322*b* and "inattentive driving" as the driver factor 322*d* stores information indicating that the "distance to a rear vehicle is 25 m or shorter". The threshold information 322*g* of the individual adaptive rule information 322 including "pedestrian detection" as the vehicle warning type 322*b* and "inattentive driving" as the driver factor 322*d* stores information indicating that the "distance to a pedestrian is 30 m or shorter". When the distance between the vehicle A and another vehicle or a pedestrian is within the numeric range identified based on the threshold information 322*g*, the output determination unit 116 outputs warning information.

For example, assume that "inattentive driving" is detected as a driver factor in Step S39 and a vehicle distance satisfying the "distance to a front vehicle is 20 m or shorter" is acquired as a vehicle state in Step S33. The output determination unit 116 determines that the vehicle state is within the numeric range identified by the threshold information included in the top record in the individual adaptive rule information 121, out of the threshold information extracted in Step S42.

Turn the description back to FIG. 11. When the output determination unit 116 determines that the vehicle state is within the threshold range (in a case of "YES" in Step S43), the output determination unit 116 outputs driver factor warning (Step S44). Specifically, the output determination unit 116 refers to the individual adaptive rule information 121 and identifies the record including the vehicle state determined to be within the threshold range in Step S43 among the records extracted in Step S42. The output determination unit 116 identifies the output identification information in the identified record.

The output determination unit 116 refers to the output warning information 122 by using the identified output identification information, to identify output information to output to each output device. The output determination unit 116 outputs warning information related to the driver factor via the output unit 140 by using the identified output information. The output determination unit 116 thereafter returns the processing to Step S33.

In contrast, when the output determination unit 116 determines that the vehicle state is not within the threshold range (in a case of "NO" in Step S43), the output determination unit 116 returns the processing to Step S33. In other words, even when the driver's state acquisition unit 113 determines that a driver factor, such as inattentive driving, is present in Step S39, the output determination unit 116 prevents driver factor warning from being output when the vehicle state does not satisfy the condition specified by the individual adaptive rule information 121.

Note that, after the output of the driver factor warning, the output determination unit 116 determines whether or not the driver factor is eliminated by using the driver's state acquired by the driver's state acquisition unit 113 in Step S34. When the output determination unit 116 determines that the driver factor is eliminated, the output determination unit 116 stops display of the driver factor warning.

In other words, even when the driver looks away and immediately turns his/her line of sight back to the traveling direction, inattentive driving warning is output upon detection of a driver factor indicating inattentive driving in Step S36 or Step S39. When it is detected thereafter that the driver factor is eliminated, the output determination unit 116 stops the output of the inattentive driving warning.

FIG. 14 is a diagram (part 3) illustrating an example of the output information. FIG. 14 is used to describe a state after the vehicle warning (having a type "front collision") based on the vehicle state illustrated in FIG. 12A is output from the drive assist device 20 and the individual adaptive rule information 322 is generated. FIG. 14A illustrates a vehicle state where the vehicle A is about to approach the front vehicle but vehicle warning is not output yet. A description will be given of a case where inattentive driving is detected in this vehicle state.

When the individual adaptive rule information 322 for front collision detection in relation to the driver of the vehicle A is generated and inattentive driving is detected, the output determination unit 116 determines whether or not the value representing the vehicle state is within the numeric range identified based on the threshold information 322*g* in the individual adaptive rule information 322. In the case of this example, since the individual adaptive rule information 322 based on the vehicle warning in relation to front collision detection is generated, a generated record includes threshold information indicating a threshold for the vehicle distance to the front vehicle. Specifically, when the vehicle distance to the front vehicle is within the numeric range identified by the threshold, the output determination unit 116 determines to output inattentive driving warning, which is driver factor warning against inattentive driving.

FIG. 14B illustrates a display example of the head-up display 405 to output inattentive driving warning. A character string calling attention not to look away is displayed, as warning information, in the display area 1712 of the head-up display 405. FIG. 14C illustrates a display example of the meter display 406 to output inattentive driving warning. Information describing a state being a factor of the inattentive driving warning is output in the display area 1722 of the meter display 406. A state where the vehicle A is about to approach the front vehicle is displayed in the display area 1722 in FIG. 14C.

FIG. 15 is a diagram (part 4) illustrating an example of the output information. FIG. 15 is used to describe a state after the vehicle warning (having the type "pedestrian") based on the vehicle state illustrated in FIG. 13A is output and the individual adaptive rule information 322 is generated. FIG. 15A illustrates a vehicle state where the vehicle A is about to approach a pedestrian but vehicle warning is not output yet. A description will be given of a case where inattentive driving is detected in this vehicle state.

When the individual adaptive rule information 322 in relation to pedestrian detection for the driver of the vehicle A is generated and inattentive driving is detected, the output determination unit 116 determines whether or not the value representing the vehicle state is within the numeric range identified based on the threshold information 322g in the individual adaptive rule information 322. In the case of this example, since the individual adaptive rule information 322 based on the vehicle warning in relation to pedestrian detection is generated, a generated record includes threshold information indicating a threshold for the distance between the vehicle A and the pedestrian. Specifically, when the distance to the pedestrian is within the numeric range identified by the threshold, the output determination unit 116 determines to output inattentive driving warning.

FIG. 15B illustrates a display example of the head-up display 405 to output inattentive driving warning. A character string calling attention not to look away is displayed, as warning information, in the display area 1712 of the head-up display 405. FIG. 15C illustrates a display example of the meter display 406 to output inattentive driving warning. Information describing a state being a factor of the inattentive driving warning is output in the display area 1722 of the meter display 406. A state where the vehicle A is about to approach the pedestrian is displayed in the display area 1722 in FIG. 15C.

In the present embodiment, the rule management device 30 generates and manages, for each driver, the individual adaptive rule information 322 corresponding to an operation by the driver. When a driver is identified at the time of driving, the individual adaptive rule information 322 is transmitted from the rule management device 30 to the warning output device 10, and warning is displayed based on the individual adaptive rule information 121 in the warning output device 10. With this, it is possible to perform appropriate display for each driver even in a case of, for example, car rental, car sharing, and the like where different drivers drive a shared vehicle.

Note that generation and management of the individual adaptive rule information 322 may be performed by the warning output device 10. In this case, for example, the warning output device 10 may identify a driver, generate the individual adaptive rule information 322 for each driver, and perform display of warning information by using the generated individual adaptive rule information 322. With this, it is possible to perform appropriate display for each driver without communicating with external devices.

In the present embodiment, it is determined, also when a driver factor such as inattentive driving is detected, whether vehicle warning has been output in the past in a state where the driver factor is present, and determined whether or not to output driver factor warning, based on a comparison between the current vehicle state and the vehicle state upon the output of the vehicle warning. With this, it is possible to avoid any complexity due to unnecessary output of warning compared with an embodiment in which warning is output every time a driver factor is detected.

In the above, each of the embodiments and modifications according to the present invention is described. The present invention is not limited to the examples of the embodiments described above, and encompasses various modifications. For example, the examples of the embodiments described above are described in detail for the sake of better understanding of the present invention, and the present invention is not limited to including all the configurations described herein. A part of a configuration of one example of one embodiment can be replaced with a configuration of another example. A configuration of another example can be added to a configuration of one example of one embodiment. Another configuration can be added to, deleted from, and replaced with a part of a configuration of one example of each embodiment. A part or all of each configuration, function, processing unit, processing means, and the like described above may be designed in an integrated circuit to be implemented as hardware, for example. Control lines and information lines illustrated in the drawings are those considered necessary for the sake of description, and do not represent all control lines and information lines. It may be considered that almost all of the configurations are connected to each other.

The functional configurations of the warning output device 10, the drive assist device 20, and the rule management device 30 described above are classified according to main details of their processing, for the sake of easier understanding. How the components are classified and referred to do not limit the invention of the present application. The configurations of the warning output device 10, the drive assist device 20, and the rule management device 30 can be further classified to have more components, according to the details of their processing. The components can be classified so that one component performs more processing.

REFERENCE SIGNS LIST

1 Warning output system
10 Warning output device
20 Drive assist device
30 Rule management device
110, 210, 310 Control unit
111 Individual adaptive rule acquisition unit
112 Vehicle state acquisition unit
113 Driver's state acquisition unit
115 Vehicle warning reception unit
116 Output determination unit
120, 320 Storage unit
121, 322 Individual adaptive rule information 122 Output warning information
123 Output specification information
130 Input unit
140 Output unit
150 In-vehicle communication unit
160 External communication unit
161 Arithmetic device
162 Memory
163 External storage device
164 Positioning signal receiver
165 Input I/F
166 Output I/F
167a, 167b Communication device
168 Storage medium drive device
169 Medium
211 State detection unit
212 Vehicle warning report unit
220, 330 Communication unit
311 Information generation unit
312 Individual adaptive rule transmission unit
313 Driver identifying unit
321 Vehicle warning detection information
323 Driver information
401 Exterior-imaging camera
402 Interior-imaging camera
403 Seat vibration function
404 Speaker
405 Head-up display
406 Meter display
1711, 1721 Display screen
1712, 1722 Display area

What is claimed is:

1. A warning output device comprising:
a driver's state acquisition unit configured to acquire inattentive driving information indicating that a driver performs inattentive driving;
a vehicle state acquisition unit configured to acquire a vehicle state;
a vehicle warning reception unit configured to receive vehicle warning which is warning corresponding to the vehicle state;
an adaptive rule acquisition unit configured to acquire adaptive rule information generated when the driver performs inattentive driving and the warning is received; and
an output unit configured to output inattentive driving warning which is warning related to inattentive driving when the driver's state acquisition unit acquires the inattentive driving information and the vehicle state satisfies a predetermined condition specified by the adaptive rule information,
wherein the output unit is further configured to:
extract threshold information corresponding to the adaptive rule information acquired,
determine that the vehicle state is within a threshold range, by comparing the threshold information extracted and the vehicle state,
when the vehicle state is within the threshold range, the inattentive driving warning is output, and
when the vehicle state is not within the threshold range, the inattentive driving warning is not output,
wherein the threshold range is the predetermined condition,
wherein each of a plurality of drivers corresponds to each of a plurality of adaptive rule information, the plurality of adaptive rule information includes the adaptive rule information, and
wherein the adaptive rule information is associated with the predetermined condition for outputting the inattentive driving warning.

2. The warning output device according to claim 1, wherein
the output unit prevents the inattentive driving warning from being output when the vehicle state does not satisfy the predetermined condition even if the driver's state acquisition unit acquires the inattentive driving information.

3. The warning output device according to claim 1, comprising
a driver related information acquisition unit configured to acquire driver related information to be used to identify a driver, wherein
the adaptive rule acquisition unit acquires the adaptive rule information generated for the driver identified by using the driver related information, and
the output unit outputs the inattentive driving warning when the vehicle state in driving by the driver identified by using the driver related information satisfies the predetermined condition specified by the adaptive rule information related to the driver.

4. The warning output device according to claim 3, wherein
when the adaptive rule information of the driver identified by using the driver related information is not identified, the adaptive rule acquisition unit does not acquire the adaptive rule information, and
the output unit outputs the inattentive driving warning when the adaptive rule acquisition unit does not acquire the adaptive rule information and the driver's state acquisition unit acquires the inattentive driving warning.

5. The warning output device according to claim 1, further comprising:
an output determination unit configured to determine whether or not the vehicle state satisfies the predetermined condition, wherein
the vehicle warning reception unit receives the vehicle warning, a type of the vehicle warning being specified in the vehicle warning,
the adaptive rule information includes the type, and
the output determination unit identifies, as the predetermined condition, the threshold range identified by using the type and determines, when the driver's state acquisition unit acquires the inattentive driving information, whether or not the predetermined condition is satisfied, by using a value indicating the vehicle state acquired by the vehicle state acquisition unit and the threshold range.

6. The warning output device according to claim 1, wherein
the output unit identifies a vibration pattern corresponding to the inattentive driving warning and vibrates a driver's seat by using the vibration pattern.

7. A warning output method performed by a warning output device, the warning output device including a driver's state acquisition unit, a vehicle state acquisition unit, a vehicle warning reception unit, an adaptive rule acquisition unit, and an output unit, the warning output method comprising:
performing, by the driver's state acquisition unit, a driver's state acquisition procedure for acquiring inattentive driving information indicating that a driver performs inattentive driving;

performing, by the vehicle state acquisition unit, a vehicle state acquisition procedure for acquiring a vehicle state;

performing, by the vehicle warning reception unit, a vehicle warning reception procedure for receiving vehicle warning which is warning corresponding to the vehicle state;

performing, the adaptive rule acquisition unit, an adaptive rule acquisition procedure for acquiring adaptive rule information generated when the driver performs inattentive driving and the warning is received; and performing, the output unit, an output procedure for outputting inattentive driving warning which is warning related to inattentive driving when the inattentive driving information is acquired in the driver's state acquisition procedure and the vehicle state satisfies a predetermined condition specified by the adaptive rule information, wherein the output unit is further configured to:
  extract threshold information corresponding to the adaptive rule information acquired,
  determine that the vehicle state is within a threshold range, by comparing the threshold information extracted and the vehicle state,
    when the vehicle state is within the threshold range, the inattentive driving warning is output, and
    when the vehicle state is not within the threshold range, the inattentive driving warning is not output, wherein the threshold range is the predetermined condition, wherein each of a plurality of drivers corresponds to each of a plurality of adaptive rule information, the plurality of adaptive rule information includes the adaptive rule information, and wherein the adaptive rule information is associated with the predetermined condition for outputting the inattentive driving warning.

8. A warning output system comprising:
a rule management device; and
a warning output device included in a vehicle, wherein
the rule management device includes
  an information generation unit configured to generate adaptive rule information when a driver of the vehicle performs inattentive driving and the warning output device receives vehicle warning which is warning corresponding to a vehicle state, and
  an adaptive rule transmission unit configured to transmit the adaptive rule information to the warning output device, and
the warning output device includes
  a driver's state acquisition unit configured to acquire inattentive driving information indicating that the driver performs inattentive driving,
  a vehicle state acquisition unit configured to acquire the vehicle state,
  a vehicle warning reception unit configured to receive the vehicle warning,
  an adaptive rule acquisition unit configured to acquire adaptive rule information generated when the driver performs inattentive driving and the warning is received, and
  an output unit configured to output inattentive driving warning which is warning related to inattentive driving, when the driver's state acquisition unit receives the inattentive driving information and the vehicle state satisfies a predetermined condition specified by the adaptive rule information, wherein the output unit is further configured to:
  extract threshold information corresponding to the adaptive rule information acquired,
  determines that the vehicle state is within a threshold range, by comparing the threshold information extracted and the vehicle state,
    when the vehicle state is within the threshold range, the inattentive driving warning is output, and
    when the vehicle state is not within the threshold range, the inattentive driving warning is not output, wherein the threshold range is the predetermined condition, wherein each of a plurality of drivers corresponds to each of a plurality of adaptive rule information, the plurality of adaptive rule information includes the adaptive rule information, and wherein the adaptive rule information is associated with the predetermined condition for outputting the inattentive driving warning.

* * * * *